United States Patent Office 2,713,245
Patented July 19, 1955

2,713,245

INTERNAL COMBUSTION TURBINE POWER PLANTS WITH REGENERATIVE EXHAUST TREATMENT SYSTEM

John H. Weaving, Moseley, Birmingham, England, assignor to The Austin Motor Company Limited, Northfield, Birmingham, England Application November 24, 1952, Serial No. 322,186

1 Claim. (Cl. 60—39.51)

This invention relates to internal combustion turbine power plants which are required to operate on full load for only a small percentage of the running time, and more particularly to such internal combustion turbine power plants for aircraft or for road and rail vehicles.

When vehicles and aircraft are fitted with internal combustion turbines, it is desirable, but usually difficult, to include between the compressor and the combustion chamber or chambers a heat exchanger for preheating the compressed air, the heat for this purpose being derived from the turbine exhaust gases which are passed through the heat exchanger before being discharged to exhaust.

With such an arrangement the air taken in by the compressor is compressed thereby and in consequence becomes heated to some extent, and it then passes through one side of the heat exchanger, of any conventional type, and which may, for example, consist of a series of tubes extending through an outer casing, through which casing the hot turbine exhaust gases are caused to flow, said gases being deflected or circulated around the tubes to ensure good heat exchange. The compressed air passing through the heat exchanger tubes is pre-heated by conduction through the walls of said tubes, and the pre-heated air passes to the combustion chamber or chambers where it receives further heat by the combustion of fuel. The gases leaving the combustion chamber or chambers are then expanded through the turbine to perform useful work and leave the turbine at a pressure somewhat above atmospheric pressure. Instead of being discharged directly to exhaust, the hot waste gases are directed through ducts to the other side of the heat exchanger where, as previously described, they flow round the tubes through which the air passes, and after giving up a large part of their heat, pass to exhaust. The heat thus extracted from the turbine exhaust gases gives an approximately equivalent saving in fuel.

This well-known system incorporating pre-heating of the compressed air in a heat exchanger may be successfully applied to power house and like stationary installations. When, however, it is desired to apply the heat exchanger principle to internal combustion turbines for aircraft or vehicles with a view to saving fuel, weight and space limitations become very important, and, in general, the weight and size of a heat exchanger required to cope with full load running conditions make such applications of doubtful value.

According to the present invention, we provide in an internal combustion turbine power plant for an aircraft or vehicle, or other application in which the turbine is required to operate under part load conditions for the majority of the running time, a heat exchanger system which is designed to function, through either or both sides thereof, only for the reduced mass flow obtaining under the usual or part load conditions, means being incorporated for diverting from the heat exchanger excess mass flow for which the said system is not designed to function.

Preferably at either or both sides of the heat exchanger, designed to function for the reduced mass flow, means may be provided for by-passing any mass flow in excess of that obtaining under the usual or part load conditions. This enables the heat exchanger to be of considerably smaller size on either the air side (i. e. that part thereof through which the air flows) or the exhaust side (i. e. that part thereof through which the exhaust gases flow) or on both sides. As a heat exchanger designed on either side for the usual or part load conditions would if called upon to operate under full load conditions be extremely inefficient due to exhaust and air pressure losses, by providing said by-pass means it is arranged that the pressure drop across the heat exchanger can be maintained at that required to give a useful heat exchange effect.

Said by-pass means preferably comprises ducts or orifices incorporating control means for bringing them into or out of use as required. It will be understood that where the heat exchanger is simply by-passed by a duct or orifice there will be inherently less pressure drop through the by-pass than through the heat exchanger, unless special provision is made, and in this connection the pressure difference across the heat exchanger may be maintained at approximately the designed value for usual or part load conditions while the by-pass is in operation by providing flow restricting means in the by-pass. Nevertheless in the case of unrestricted by-pass there will be less heat exchange, but there will be a gain in the fact that there will be very little pressure drop across the heat exchanger and by-pass in parallel, and consequently a higher maximum power output at full load.

The invention will now be further described with reference to the accompanying drawings, in which.

Figure 1:
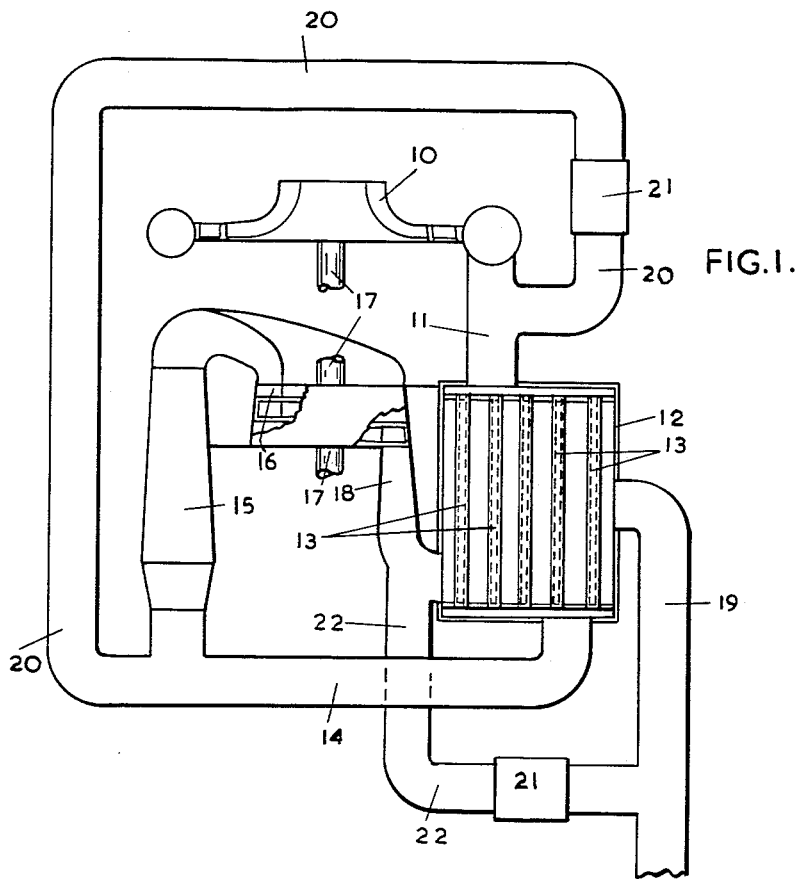
Fig. 1 is a diagrammatic lay-out of an internal combustion turbine power plant and heat exchanger system.

Referring to Fig. 1 of the drawings, air is taken in by the compressor 10, is compressed thereby and led by the duct 11 to the air side of the heat exchanger 12, passes through the bank of tubes 13 comprising the said air side of the heat exchanger, and is pre-heated in said tubes before passing through the duct 14 to the combustion chamber 15 where it receives further heat by combustion of fuel. Hot burnt gases leaving the combustion chamber 15 expand through the turbine 16 to perform useful work in rotating the shaft 17, which besides being the power take-off shaft drives the compressor 10 in well-known manner.

Exhaust gases from the turbine 16 are directed through the duct 18 to the other side of the heat exchanger 12, and entering the outer casing thereof circulated over and around the tubes 13 through which air is passing, and after giving up heat pass to atmosphere through the duct 19.

In a conventional installation, the heat exchanger system so far described would be of such capacity as to cope with maximum mass flow obtaining under full-load running conditions, but in accordance with the present invention the heat exchanger 12 depicted in Fig. 1 is of such weight and size that it is designed to function, at both sides, only for the reduced mass flow obtaining under the usual part-load conditions at which the turbine operates for the majority of the running time.

On the air side, a duct 20 connects the duct 11 directly with the combustion chamber 15, so that said duct 20 is in parallel with the air side of the heat exchanger 12 and can function to by-pass the heat exchanger, and deliver to the combustion chamber, any excess mass flow with which the air side thereof is not designed to function. Control means, indicated by the rectangle 21, are provided in the duct 20 and may be any suitable mechanism, examples of which are described below, for bringing this by-pass duct 20 into and out of use, as necessary.

Similarly, on the exhaust side of the heat exchanger 12, a duct 22 connects the duct 18 directly with the duct 19 which leads to atmosphere, so that the duct 22 is in parallel with the exhaust side of the heat exchanger 12, and can function to by-pass past the heat exchanger, and directly to atmosphere, any excess mass flow with which the exhaust side thereof is not designed to function.

The rectangle 21 in the duct 22 indicates like control means incorporated therein, as above-mentioned with reference to the by-pass duct 20 on the air side of the heat exchanger.

Whereas in the above description, and in the diagram, both sides of the heat exchanger are designed to function for only the reduced mass flow under usual part load conditions, the heat exchanger could be designed so that the exhaust side would accommodate full mass flow for full load conditions, and a by-pass duct incorporated in the air side only, or the arrangement could be vice-versa.

Figure 2:
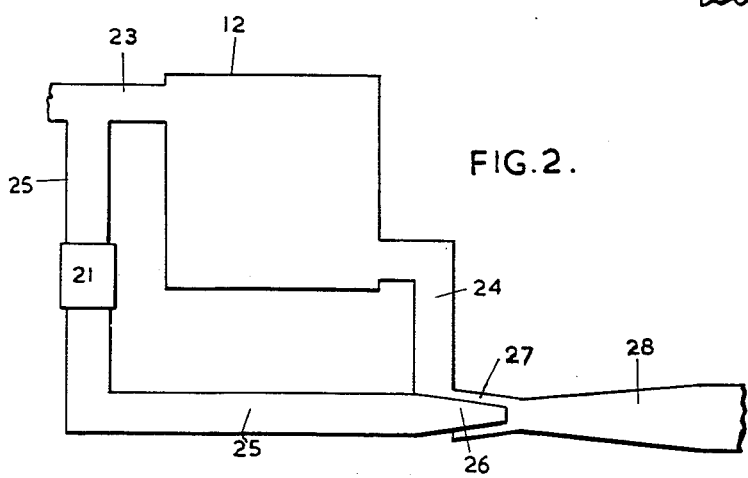
Fig. 2 is a detail view showing, diagrammatically, one side of the heat exchanger, a by-pass, and one form of by-pass flow restricting means.

Referring now to Fig. 2 of the drawings which shows diagrammatically one side of the heat exchanger 12 (it could be either side), the path of gas flow therethrough being from the duct 23 into the heat exchanger 12, and from the heat exchanger via the duct 24. Duct 25 is a by-pass duct, incorporating control means 21. The duct 25 is provided with a venturi nozzle outlet 26 located in a venturi throat 27 afforded in the duct 24. This is an arrangement which modifies the loss of pressure drop across the heat exchanger which would occur if the by-pass duct when in use were unrestricted in any way, and in operation the gas jet issuing from the nozzle 26 of the by-pass duct 25 into the venturi throat 27 represents an increase in velocity of by-passing gas, in the nozzle 26, at the expense of pressure drop in the by-pass, and at the same time this jet imparts some of its momentum to the gas issuing from the heat exchanger in the duct 24 so as to induce a common velocity in the mixing gases, which diffuse to some extent in the gradually expanding pipe 28 and thereby regaining some of the pressure drop necessary to the forcing of gas through the heat exchanger 12. By this method the minimum pressure loss is suffered, while still using the heat exchanger 12 to its maximum advantage, even up to the maximum load running conditions.

Figure 3:
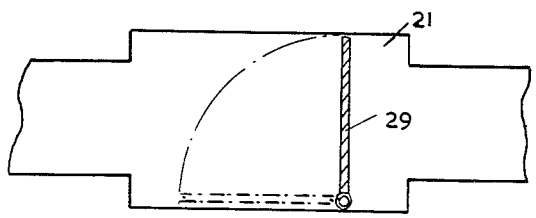
Figs. 3 and 4 are detail views showing, diagrammatically, different forms of by-pass duct control means and flow restricting means.
Figure 4:
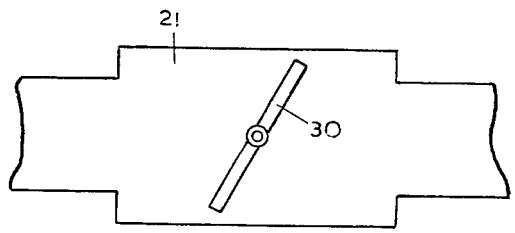

Referring now to Figs. 3 and 4, in Fig. 3 is illustrated one form of by-pass duct control means 21, and said means consists of a simple pivotal shut-off valve 29, which is moved from duct-open to duct-closed positions to bring the by-pass duct into or out of use.

Fig. 4 shows an alternative construction of by-pass duct control means 21, consisting of a butterfly throttle valve 30. Obviously this valve 30 can, besides being utilised for simple opening and closing the by-pass duct, be employed as a variable restriction valve for maintaining the requisite pressure drop across the heat exchanger by restricting the by-pass appropriately, being opened progressively and proportionally with increasing total mass flow above that obtaining under usual or part flow conditions.

The by-pass control means above described would preferably be operated automatically in any suitable way and in accordance with operating or load conditions of the turbine and would, of course, be completely closed below the normal or part load conditions for which the heat exchanger is designed.

In a case where more than one heat exchanger is employed arranged in series, this operating principle of the invention may be applied in stages, firstly by-passing one heat exchanger and secondly by-passing both, and this system could be applied to the air sides only or the exhaust sides only, or to both sides as the design of any particular installation requires.

Having fully described my invention, what I claim and desire to secure by Letters Patent is:

In an internal combustion turbine power plant of the type in which the turbine is required to operate under part load conditions for the majority of the running time, a heat exchanger system incorporating a heat exchanger having at least one side of the two sides thereof designed for reduced mass flow obtaining under said part load conditions, a duct adapted to by-pass said side of the heat exchanger and to carry any excess mass flow for which said side is not designed, a further duct conveying gas which has passed through the heat exchanger, a venturi nozzle outlet in said duct and a venturi throat in said further duct in which said nozzle is located.

References Cited in the file of this patent

UNITED STATES PATENTS

| | | |
|---|---|---|
| 2,470,184 | Pfenninger | May 17, 1949 |
| 2,489,939 | Traupel | Nov. 29, 1949 |
| 2,622,395 | Bowden | Dec. 23, 1952 |
| 2,692,477 | Toogood | Oct. 26, 1954 |

FOREIGN PATENTS

| | | |
|---|---|---|
| 484,289 | Great Britain | May 3, 1938 |